United States Patent [19]
Podoloff

[11] Patent Number: 5,905,485
[45] Date of Patent: May 18, 1999

[54] CONTROLLER WITH TACTILE SENSORS AND METHOD OF FABRICATING SAME

[75] Inventor: Robert Michael Podoloff, Framingham, Mass.

[73] Assignee: Breed Automotive Technology, Inc., Lakeland, Fla.

[21] Appl. No.: 08/799,282

[22] Filed: Feb. 13, 1997

[51] Int. Cl.[6] .................................................. G09G 5/08
[52] U.S. Cl. .................... 345/157; 345/161; 345/174; 73/862.05; 200/5 A; 338/99
[58] Field of Search .................... 345/157, 173, 345/160, 174, 177, 161, 168; 178/18, 19; 200/5 R, 6 R, 5 B, 5 C, 5 D, 5 E, 5 A; 338/99; 73/862.05, 862.043

[56] References Cited

U.S. PATENT DOCUMENTS

| | | | |
|---|---|---|---|
| 3,011,063 | 11/1961 | Deutschle | 307/32 |
| 4,091,234 | 5/1978 | Bristow | 178/18 |
| 4,493,219 | 1/1985 | Sharp et al. | 73/862.05 |
| 4,747,313 | 5/1988 | Okada | 73/862.043 |
| 4,810,992 | 3/1989 | Eventoff | 338/99 |
| 5,184,009 | 2/1993 | Wright et al. | 250/227.11 |
| 5,499,041 | 3/1996 | Brandenburg et al. | 345/174 |
| 5,510,812 | 4/1996 | O'Mara et al. | 345/161 |
| 5,541,570 | 7/1996 | McDowell | 338/47 |
| 5,541,622 | 7/1996 | Engle et al. | 345/161 |

*Primary Examiner*—Jeffery A. Hofsass
*Assistant Examiner*—Davetta Woods
*Attorney, Agent, or Firm*—L. R. Drayer

[57] ABSTRACT

A controller with a plurality of tactile sensors and a method of fabricating the controller is disclosed. The controller may be used for one, two or three parameter control in applications requiring manual user control of parameters such as temperature, volume, speed, direction and cursor position on a computer screen. The controller comprises two or more tactile sensors and a computing means. The centers of the tactile sensors are positioned at angles about a common center point. The computing means determines a magnitude and a direction of a resultant force from all the tactile sensors, using the force applied to each tactile sensor and the angle at which the center of each tactile sensor is oriented about a common center point. The configuration enables sensing applied force in two or more directions at angles from a common center point. Another parameter may be controlled based on the total force applied to all of the tactile sensors of the controller.

35 Claims, 2 Drawing Sheets

CONTROLLER WITH TACTILE SENSORS AND METHOD OF FABRICATING SAME

BACKGROUND

This invention relates generally to devices for receiving manual user input for control of parameters such temperature, volume, speed, direction, and cursor movement on a computer screen. It relates to the field of computer input devices where joy sticks, mice, and track balls find common usage as pointing devices. The present invention is a tactile device based on analog control and has an output resistance which varies with the force applied to the device. It relates more specifically to an improved device for electronic positional and directional control using a plurality of individual tactile sensors.

Various electronic positional and directional control devices are available that enable a user to control either one or two parameters. An example of one parameter control is the use of up arrow keys and down arrow keys to scroll text in an up or down direction on a computer screen when using a word processor computer program. Touch pads are also used for one parameter control in applications requiring manual control, such as the liquid level in a container or volume from an acoustic speaker system. An example of two parameter control is the use of mice, trackballs, or joysticks to position a cursor or other object in an up and down direction and in a left and right direction on a computer screen. A more recent application is the provision of a miniature joystick in the middle of a conventional computer keyboard. These and similar devices are well known in the art and are generally limited to two parameter control without the addition of hardware and software to provide additional capability. For example, a mouse is capable of two parameter up, down, left and right positioning, but requires a button to provide a third parameter for "clicking" on an object on the computer screen.

Some of the limitations of arrow keys and keypads are the need to reposition a finger to a different location in order to adjust or change direction of the control parameter. A limitation of mice and trackballs is the need for a clean environment and maintenance of the mechanical revolving structure and associated sensing devices. In addition, mice require a surface area on which to move. Joysticks are generally constructed such that a pivoting lateral movement of the vertical joystick is translated into a vertical force on at least four force sensors by four laterally extending arms fixed to the bottom of the joystick. This arrangement requires a relatively complex assembly to provide for the translation of the joystick movement into vertical forces on the force sensors. The translation of the force on the joystick into positional commands requires that there be a force on all sensors to prevent loss of information. In order to prevent this loss of information, a preload spring is required on each sensor. The force sensors used in these various controllers include piezoelectric devices, semiconductor devices, capacitive devices and conductive ink devices. Examples of control devices are described in the following U.S. Letter Pat. Nos. 3,011,063; 4,091,234; 4,493,219; 4,810,992; 5,510,812; 5,541,570; and 5,541,622.

It is desirable that a controller device with tactile sensors be relatively simple and reliable, that the controller device does not require finger repositioning or frequent cleaning and maintenance, that the controller device have no moving parts and no requirement for mechanical preloading, and that the controller device be capable of providing for one, two, or three parameter control.

SUMMARY

The present invention is directed to a controller with tactile sensors and method of fabricating a controller with tactile sensors that satisfies these needs. The present invention provides for a relatively simple and reliable controller with tactile sensors that does not require finger repositioning or frequent cleaning and maintenance, that has no moving parts and no requirement for mechanical preloading, and that is capable of providing for one, two, or three parameter control.

A device having features of the present invention comprises two or more tactile sensing means with a center, positioned at an angle about a common center point for sensing applied force in two or more directions at angles from the common center point. The present invention also comprises a computing means for determining a magnitude and a direction of a resultant force from all the tactile sensing means, using the force applied to each tactile sensing means and the angle at which the center of each tactile sensing means is oriented about the common center point. In an alternate embodiment of the invention, the two or more tactile sensing means partially overlap each other. The shape of the tactile sensing means may be any one of a variety of shapes including, but not limited to a circle, an ellipse, a triangle, a square, a rectangle, a hexagon, or an octagon. In another alternate embodiment, each tactile sensing means has fingers that are shaped in a manner that are interdigitated with similarly shaped fingers of each opposing tactile sensing means. Each tactile sensing means may be formed by positioning a thin layer of force sensitive resistive material between two thin backing sheets and connected to a means for measuring the change in resistance of the force sensitive resistive material resulting from an applied force on the sensing means. In one variation of the formation of the tactile sensing means, the force sensitive resistive material is force sensing ink. The invention may be operated with a finger force applied directly to the two or more tactile sensing means, with the finger force applied to a flexible semi-spherical pad positioned over the two or more tactile sensing means for distributing the applied force to the two or more tactile sensing means, or with the finger force applied to a flexible circular pad positioned over the two or more two or more tactile sensing means for distributing the applied force to the two or more tactile sensing means. An alternate embodiment of the invention is where the computing means also comprises a means for computing the sum of the magnitudes of the applied force to each tactile sensing means, providing a total force control parameter in addition to the resultant force magnitude and direction. The sensitivity of the present invention to forces at direction angles along lines connecting the center of each tactile sensing means and the common center point may be increased by moving the center of each tactile sensing means closer to the common center point. The sensitivity of the present invention to forces at direction angles between the lines connecting the center of each tactile sensing means and the common center point may be increased by moving the center of each tactile sensing means farther from the common center point. The angular resolution of the resultant force direction may be increased by increasing the number of tactile sensing means.

An embodiment of a two device version of the controller with tactile sensors comprises a first circular tactile sensing device for sensing a first applied force, a second circular tactile sensing device opposite the first circular tactile sensing device for sensing a second applied force, and a means for computing a normalized resultant force magnitude and polarity by computing the ratio of the difference to the sum of the first applied force and the second applied force on each tactile sensing device. An alternate embodiment of the invention is where the first tactile sensing device partially overlaps the second tactile sensing device. Yet another alternate includes the shaping of fingers on both tactile sensing devices and positioning the tactile sensing devices so that the fingers form an interdigitated pattern with respect to the two tactile sensing devices. Each of the tactile sensing devices may be formed by positioning a thin layer of force sensing ink between two thin backing sheets, and providing a means to measure the change in resistance of the force sensing ink due to applied force on the tactile sensing devices. An alternate embodiment of the two device controller with tactile sensors comprises a flexible semi-spherical pad positioned over the tactile sensing devices for distributing an applied force to the tactile sensing devices. A further embodiment of the two device controller with tactile sensors is to add another parameter sensing capability by adding a means for computing the sum of the magnitudes of the first and second applied forces, thereby providing a total force control parameter in addition to the normalized resultant force magnitude and polarity.

In the preferred embodiment, a four device controller with tactile sensors may be made up of a pair of two device controllers with additional means for computing a two dimensional resultant force magnitude and direction from the one dimensional resultant force magnitude and polarity. An embodiment of a four device controller with tactile sensors comprises a first circular tactile sensing device for sensing a first applied force, a second circular tactile sensing device opposite the first circular tactile sensing device for sensing a second applied force, a third circular tactile sensing device for sensing a third applied force, and a fourth circular tactile sensing device opposite the third circular tactile sensing device for sensing a fourth applied force. The circular tactile sensing devices are positioned so that a first line connecting the centers of the opposing first and second circular tactile sensing devices forms a right angle with a second line connecting the centers of the opposing third and fourth circular tactile sensing devices, where the first and second line are of equal length and bisect each other at a common center point. A first computing means computes a first normalized resultant force magnitude and polarity based on the ratio of the difference to the sum of the first and second applied forces on the first and second circular tactile sensing devices. A second computing means computes a second normalized resultant force magnitude and polarity based on the ratio of the difference to the sum of the third and fourth applied forces on the third and fourth circular tactile sensing device. An alternate to this embodiment includes a third computing means for computing a third normalized resultant force magnitude and direction angle in a two dimensional plane based on the first and second normalized resultant force magnitudes and polarities. An alternate to this embodiment provides a fourth computing means for computing the sum of the magnitudes of the applied force to each circular tactile sensing device, providing a total force parameter in addition to the first and second normalized resultant force magnitude and polarities. In the preferred embodiment, each tactile sensing device may partially overlap the other three circular tactile sensing devices. Alternatively, the first circular tactile sensing device forms an interdigitated relationship with the second circular tactile sensing device and the third circular tactile sensing device forms an interdigitated relationship with the fourth circular tactile sensing device. A further preferred embodiment is where each of the circular tactile sensing devices comprises a thin layer of force sensing ink between two thin backing sheets and a means for measuring the change in resistance of the force sensing ink due to the applied force on the sensing devices. The preferred embodiment of the four device controller with tactile sensors may also include a flexible semi-spherical pad positioned over the circular tactile sensing devices for distributing an applied force to the tactile sensing devices. The sensitivity of this embodiment to forces at direction angles along the first line connecting the centers of the first and second circular tactile sensing devices and along the second line connecting the centers of the third and fourth circular tactile sensing devices is increased by moving the center of each circular tactile sensing device closer to the common center point. The sensitivity to forces at direction angles between the first line connecting the centers of the first and second circular tactile sensing devices and the second line connecting the centers of the third and fourth circular tactile sensing devices is increased by moving the center of each circular tactile sensing device farther from the common center point.

A method of fabricating a controller with tactile sensors comprises positioning two or more tactile sensing means, each having a center, at angles about a common center point for sensing applied force in two or more angular directions from the common center point, and computing a resultant force magnitude and direction based on the applied force on each tactile sensing means and the angular direction from the common center point to the center of each tactile sensing means. An alternate embodiment further includes the step of partially overlapping the two or more tactile sensing means. Another embodiment further includes the step of shaping the tactile sensing means in an interdigitated manner with each opposing tactile sensing means. Yet another alternate embodiment further includes the step of forming each tactile sensing means by positioning a thin layer of force sensitive resistive material between two thin backing sheets and by providing a means for measuring the change in resistance of the force sensitive material due to an applied force on the tactile sensing means. An embodiment may also include the step of positioning a flexible shaped pad over the tactile sensing means for distributing an applied force to the two or more tactile sensing means. Another alternate step in the method of fabricating a controller with tactile sensors further comprises computing the sum of the magnitudes of the applied force to each tactile sensing means thereby providing an additional control parameter. Another embodiment further includes the step of increasing the sensitivity to forces in angle directions along lines connecting the center of each tactile sensing means and the common center point by moving the center of each tactile sensing means closer to the common center point. An alternate embodiment further comprises the step of increasing the sensitivity to forces in angular directions between the lines connecting the center of each tactile sensing means and the common center point by moving the center of each tactile sensing means farther from the common center point. Yet another embodiment further comprises the step of increasing the angular resolution of the resultant force angular direction by increasing the number in tactile sensing means.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
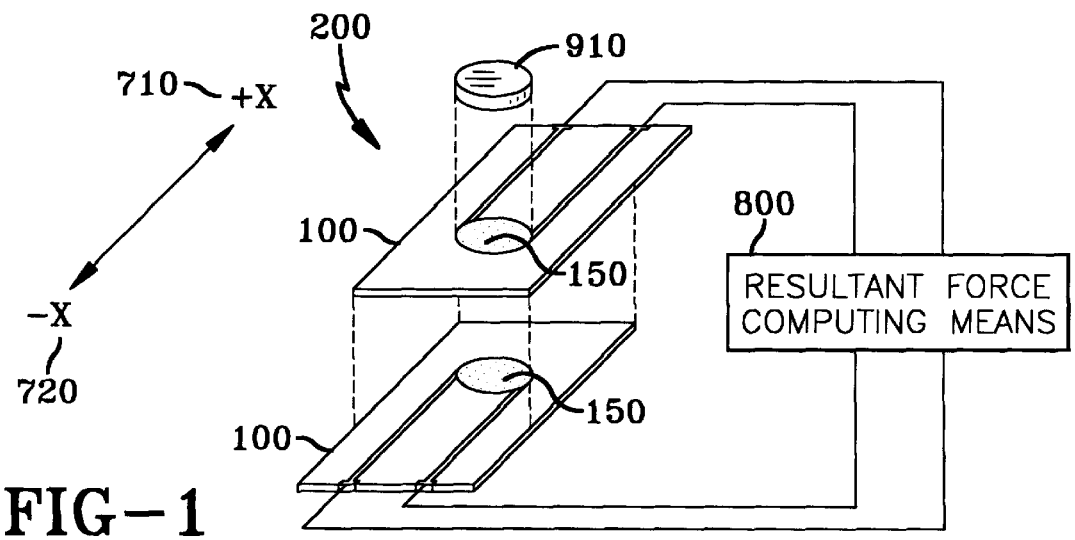
FIG. 1 is an exploded view of a two device controller with tactile sensors having a flexible circular pad over the two tactile sensing devices.

Turning now to FIG. 1, a two device controller with tactile sensors 200 is shown in accordance with the present inventive concepts. The two device controller with tactile sensors 200 comprises two force sensors 100, each force sensor 100 having a circular tactile sensing device 150 electrically connected to a resultant force computing means 800. The resultant force computing means 800 may compute a first control parameter comprising a normalized resultant force magnitude and polarity in the +X direction 710 or −X direction 720, as well as a total force that provides a second control parameter. A flexible circular pad 910 is provided to distribute applied tactile forces to the tactile sensing devices 150. The two tactile sensing devices 150 partially overlap one another, as shown in FIG. 3.

The force sensors 100 may use any one of several different sensing technologies that are well known in the art, including but not limited to piezoelectric devices, capacitive devices, semiconductor devices and conductive ink devices. The preferred embodiment of the force sensors 100 uses a force sensitive ink and is described in U.S. Letters Pat. No. 5,541,570 issued on Jul. 30, 1996, *Force Sensing Ink, Method of Making Same and Improved Force Sensor* by Donald J. McDowell. For brevity, the disclosure contained in this reference will not be repeated here. The size of each the circular tactile sensing devices 150 is typically approximately one centimeter in diameter.

Figure 2:
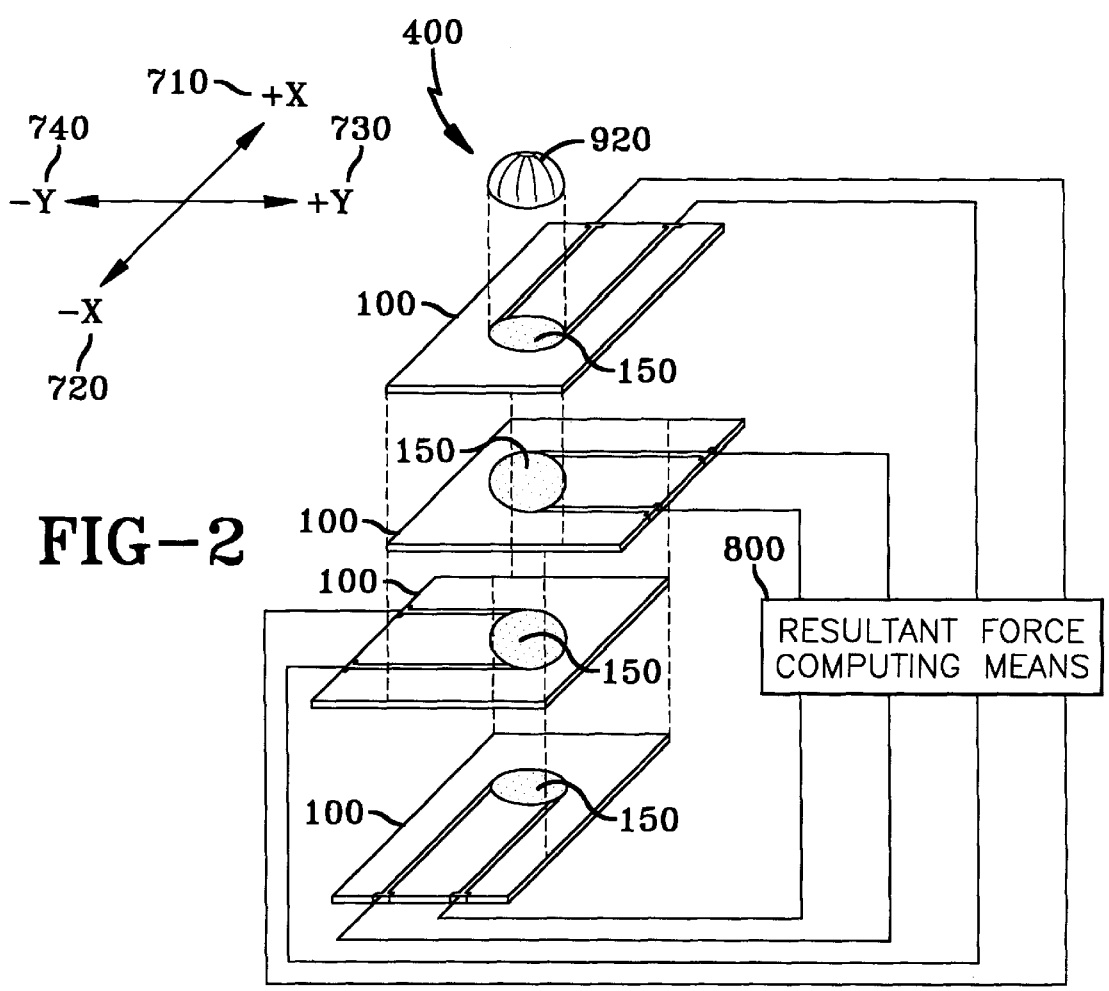
FIG. 2 is an exploded view of a four device controller with tactile sensors having a flexible semi-spherical pad over the four tactile sensing devices.

Turning now to FIG. 2, a four device controller with tactile sensors 400 is shown in accordance with the present inventive concepts. The four device controller with tactile sensors 400 comprises four force sensors 100, each force sensor 100 having a circular tactile sensing device 150 electrically connected to a resultant force computing means 800. The resultant force computing means 800 may compute a first control parameter comprising a first normalized resultant force magnitude and polarity in the +X direction 710 or −X direction 720, a second control parameter comprising a second normalized resultant force magnitude and polarity in the +Y direction 730 or the −Y direction 740, as well as a total force that provides a third control parameter. The resultant force computing means 800 may also compute a third normalized force magnitude and direction in a plane of the X and Y axis using the first and second normalized resultant force magnitudes and directions. A flexible semi-spherical pad 920 is provided to distribute applied tactile forces to the tactile sensing devices 150. The four tactile sensing devices 150 partially overlap one another, as shown in FIG. 5.

Figure 3:
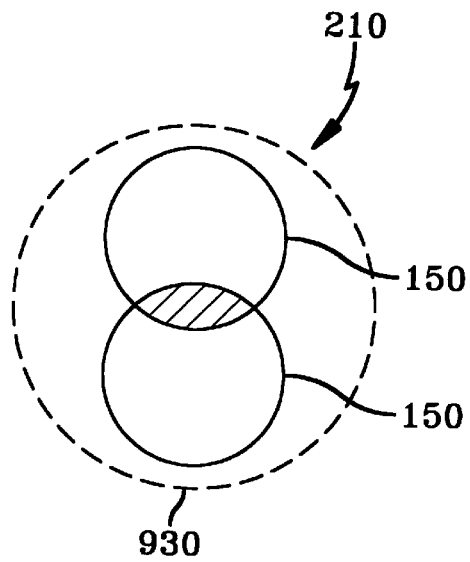
FIG. 3 shows two partially overlapping tactile sensing devices of a two device controller with tactile sensors.

FIG. 3 depicts a typical configuration of a tactile area 930 of a controller with tactile sensors 210 that has two partially overlapping circular tactile sensing devices 150. The diameter of each of the tactile sensing devices 150 is approximately one centimeter. The tactile sensing devices 150 are circumscribed within a tactile area 930 of approximately one and one-half centimeters diameter. The center of each tactile sensing device 150 is positioned at equal angles about the center of the circular tactile sensing area.

Figure 4:
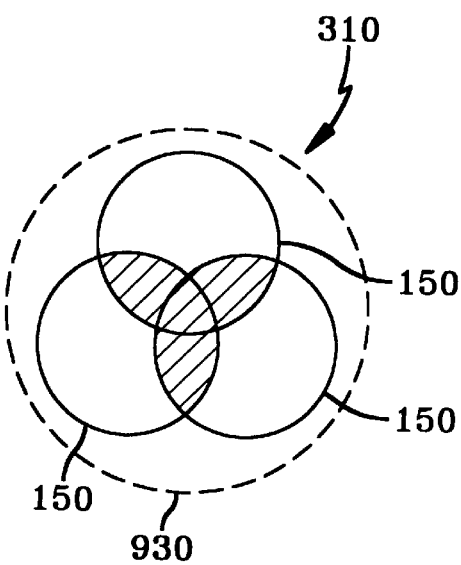
FIG. 4 shows three partially overlapping tactile sensing devices of a three device controller with tactile sensors.

FIG. 4 depicts another typical configuration of a tactile area 930 of a controller with tactile sensors 310 that has three partially overlapping circular tactile sensing devices 150. The diameter of each of the tactile sensing devices 150 is approximately one centimeter. The tactile sensing devices 150 are circumscribed within a tactile area 930 of approximately one and one-half centimeters diameter. The center of each tactile sensing device 150 is positioned at equal angles about the center of the circular tactile sensing area.

Figure 5:
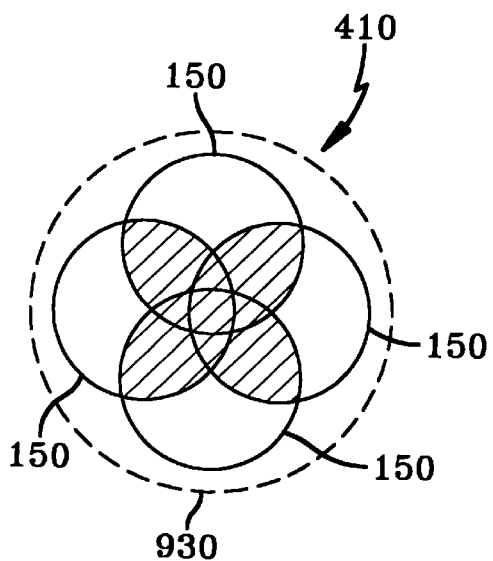
FIG. 5 shows four partially overlapping tactile sensing devices of a four device controller with tactile sensors.

FIG. 5 depicts yet another typical configuration of a tactile area 930 of a controller with tactile sensors 410 that has four partially overlapping circular tactile sensing devices 150. The diameter of each of the tactile sensing devices 150 is approximately one centimeter. The tactile sensing devices 150 are circumscribed within a tactile area 930 of approximately one and one-half centimeters diameter. The center of each tactile sensing device 150 is positioned at equal angles about the center of the circular tactile sensing area.

Figure 6:
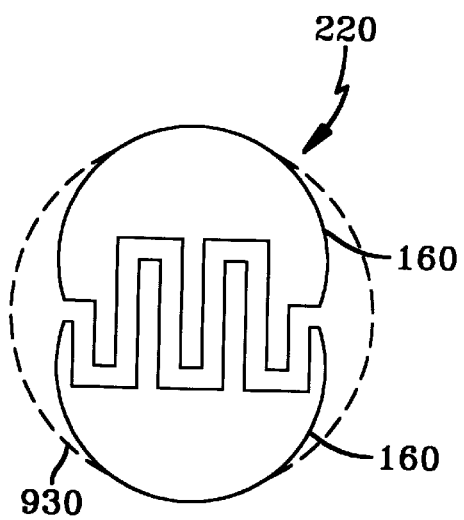
FIG. 6 shows two interdigitated tactile sensing devices of a two device controller with tactile sensors.

FIG. 6 shows a typical configuration of a tactile area 930 of a controller with tactile sensors 220 that has a pair of circular interdigitated tactile sensing devices 160. The diameter of each of the interdigitated tactile sensing devices 160 is approximately one centimeter. The tactile sensing devices 160 are circumscribed within a tactile area 930 of approximately one and one-half centimeters diameter. The center of each tactile sensing device 160 is positioned at equal angles about the center of the circular tactile sensing area.

There are a multitude of geometric variations that may be applied to the present inventive concept that does not exceed the scope of the present disclosure. For example, the shape of the tactile sensing devices is not limited to a circle, but may be an ellipse, a triangle, a square, a rectangle, or any polygon such as a hexagon or an octagon. The number of tactile sensing devices is also not limited to the two, three, or four that have been described. Other than requiring two or more devices, the number may be increased almost indefinitely, thus providing a greater resolution to the angular directional component. Another possible variation is operation of the controller with tactile sensors directly from a finger rather than interposing a pad for force distribution to the tactile sensing devices.

The sensitivity of the controllers may also be tuned by adjusting the distance of the centers of the tactile sensing devices from the center of the circular tactile area. The sensitivity to applied forces in angular directions along the lines connecting the center of each tactile sensing device and the center of the circular tactile sensing area is increased by moving the center of each tactile sensing device closer to the center of the circular sensing area. The sensitivity to applied forces in angular directions between the lines connecting the center of each tactile sensing device and the center of the circular tactile sensing area is increased by moving the center of each tactile sensing device farther away from the center of the circular sensing area Although the present invention has been described in considerable detail with reference to certain preferred embodiments thereof, other embodiments are possible. Therefore, the spirit and scope of the appended claims should not be limited to the description of the preferred embodiments herein.

I claim:

1. A controller with tactile sensors comprising:
   (a) two or more tactile sensing means, each having a center, angularly positioned about a common center point for sensing an applied force in two or more angular directions from the common center point; and
   (b) computing means for computing a resultant force magnitude and a resultant force direction based on the applied force on each tactile sensing means and the angular direction about the common center point to the center of each tactile sensing means.

2. A controller with tactile sensors according to claim 1, wherein the two or more tactile sensing means are partially overlapping each other.

3. A controller with tactile sensors according to claim 1, wherein the shape of the tactile sensing means is selected from the group consisting of a circle, an ellipse, a triangle, a square, a rectangle, a hexagon and an octagon.

4. A controller with tactile sensors according to claim 1, wherein the tactile sensing means are shaped in an interdigitated manner with each opposing tactile sensing means.

5. A controller with tactile sensors according to claim 1, wherein the tactile sensing means are formed by positioning a thin layer of force sensitive resistive material between two thin backing sheets and by providing a means for measuring the change in resistance of the resistive material due to an applied force on the sensing means.

6. A controller with tactile sensors according to claim 5, wherein the pressure sensitive resistive material is a force sensing ink.

7. A controller with tactile sensors according to claim 1, further comprising a flexible semi-spherical pad positioned over the tactile sensing means for distributing an applied force to the two or more tactile sensing means.

8. A controller with tactile sensors according to claim 1, further comprising a flexible circular pad positioned over the tactile sensing means for distributing an applied force to the two or more tactile sensing means.

9. A controller with tactile sensors according to claim 1, wherein the computing means further comprises a means for computing the sum of the magnitudes of the applied force to each tactile sensing means thereby providing a total force control parameter in addition to the resultant force magnitude and the resultant force direction.

10. A controller with tactile sensors according to claim 1, wherein the sensitivity to forces in angular directions along lines connecting the center of each tactile sensing means and the common center point is increased by moving the center of each tactile sensing means closer to the common center point.

11. A controller with tactile sensors according to claim 1, wherein the sensitivity to forces in angular directions between the lines connecting the center of each tactile sensing means and the common center point is increased by moving the center of each tactile sensing means farther from the common center point.

12. A controller with tactile sensors according to claim 1, wherein the angular resolution of the resultant force direction is increased by increasing the number of tactile sensing means.

13. A controller with tactile sensors comprising:
   (a) first circular tactile sensing device for sensing a first applied force;
   (b) second circular tactile sensing device opposite the first circular tactile sensing device for sensing a second applied force, wherein the first tactile sensing device partially overlaps the second tactile sensing device; and
   (c) computing means for computing a normalized resultant force magnitude and a resultant force polarity based on the ratio of the difference to the sum of the first applied force and the second applied force on each tactile sensing device.

14. A controller with tactile sensors according to claim 13, wherein the first circular tactile sensing device is shaped in an interdigitated manner with the second circular tactile sensing device.

15. A controller with tactile sensors according to claim 13, wherein the first circular tactile sensing device and the second circular tactile sensing device each comprise a thin layer of force sensing ink positioned between two thin backing sheets and a means for measuring the change in resistance of the force sensing ink due to the applied force on the sensing devices.

16. A controller with tactile sensors according to claim 13, further comprising a flexible semi-spherical pad positioned over the circular tactile sensing devices for distributing an applied force to the tactile sensing devices.

17. A controller with tactile sensors according to claim 13, wherein the computing means further comprises a means for computing the sum of the magnitudes of the first applied force and the second applied force thereby providing a total force control parameter in addition to the normalized resultant force magnitude and resultant force polarity.

18. A controller with tactile sensors comprising:
   (a) first circular tactile sensing device with a center, for sensing a first applied force;
   (b) second circular tactile sensing device with a center, opposite the first circular tactile sensing device for sensing a second applied force;
   (c) first computing means for computing a first normalized resultant force magnitude and a first resultant force polarity based on the ratio of the difference to the sum of the first applied force and the second applied force on the first and second circular tactile sensing devices;
   (d) third circular tactile sensing device with a center, for sensing a third applied force;
   (e) fourth circular tactile sensing device with a center, opposite the third circular tactile sensing device for sensing a fourth applied force;
   (f) second computing means for computing a second normalized resultant force magnitude and a second resultant force polarity based on the ratio of the difference to the sum of the third applied force and the fourth applied force on the third and fourth circular tactile sensing devices; and
   (g) the circular tactile sensing devices positioned such that a first line connecting the centers of the opposing first and second circular tactile sensing devices forms a right angle with a second line connecting the centers of the opposing third and fourth circular tactile sensing devices, the first and the second line being of equal length and bisecting each other at a common center point.

19. A controller with tactile sensors according to claim 18, further comprising a third computing means for computing a third normalized resultant force and a third resultant force angle in a two dimensional plane based on the first and second normalized resultant force magnitudes and on the first and second resultant force polarities.

20. A controller with tactile sensors according to claim 18, further comprising a fourth computing means for computing the sum of the magnitudes of the applied force to each circular tactile sensing device thereby providing a total force control parameter in addition to the first and second normalized resultant force magnitudes and the first and second resultant force polarities.

21. A controller with tactile sensors according to claim 18, wherein each circular tactile sensing device partially overlaps the other three circular tactile sensing devices.

22. A controller with tactile sensors according to claim 18, wherein the first circular tactile sensing device is shaped in an interdigitated manner with the second circular tactile sensing device, and the third circular tactile sensing device is shaped in an interdigitated manner with the fourth circular tactile sensing device.

23. A controller with tactile sensors according to claim 18, wherein the first, second, third, and fourth circular tactile sensing device each comprise a thin layer of force sensing ink between two thin backing sheets and a means for measuring the change in resistance of the force sensing ink due to the applied force on the sensing devices.

24. A controller with tactile sensors according to claim 18, further comprising a flexible semi-spherical pad positioned over the circular tactile sensing devices for distributing an applied force to the tactile sensing devices.

25. A controller with tactile sensors according to claim 18, wherein the sensitivity to forces in angular directions along the first line connecting the centers of the first and second circular tactile sensing devices and along the second line connecting the centers of the third and fourth circular tactile sensing devices is increased by moving the center of each circular tactile sensing device closer to the common center point.

26. A controller with tactile sensors according to claim 18, wherein the sensitivity to forces in angular directions between the first line connecting the centers of the first and second circular tactile sensing devices and the second line connecting the centers of the third and fourth circular tactile sensing devices is increased by moving the center of each circular tactile sensing device farther from the common center point.

27. A method of fabricating a controller with tactile sensors comprising the steps of:

(a) positioning two or more tactile sensing means, each having a center, angularly about a common center point for sensing an applied force in two or more angular directions from the common center point; and (b) computing a resultant force magnitude and a resultant force direction based on the applied force on each tactile sensing means and the angular direction from the common center point to the center of each tactile sensing means.

28. A method of fabricating a controller with tactile sensors according to claim 27, further comprising the step of partially overlapping the two or more tactile sensing means.

29. A method of fabricating a controller with tactile sensors according to claim 27, further comprising the step of shaping the tactile sensing means in an interdigitated manner with each opposing tactile sensing means.

30. A method of fabricating a controller with tactile sensors according to claim 27, further comprising the step of forming each tactile sensing means by positioning a thin layer of force sensitive resistive material between two thin backing sheets and by providing a means for measuring the change in resistance of the force sensitive material due to an applied force on the tactile sensor means.

31. A method of fabricating a controller with tactile sensors according to claim 27, further comprising the step of positioning a flexible shaped pad over the tactile sensing means for distributing an applied force to the two or more tactile sensing means.

32. A method of fabricating a controller with tactile sensors according to claim 27, wherein the computing step further comprises computing the sum of the magnitudes of the applied force to each tactile sensing means thereby providing an additional control parameter.

33. A method of fabricating a controller with tactile sensors according to claim 27, further comprising the step of increasing the sensitivity to forces in angular directions along the lines connecting the center of each tactile sensing means and the common center point by moving the center of each tactile sensing means closer to the common center point.

34. A method of fabricating a controller with tactile sensors according to claim 27, further comprising the step of increasing the sensitivity to forces in angular directions between the lines connecting the center of each tactile sensing means and the common center point by moving the center of each tactile sensing means farther from the common center point.

35. A method of fabricating a controller with tactile sensors according to claim 27, further comprising the step of increasing the angular resolution of the resultant force angular direction by increasing the number of tactile sensing means.

* * * * *